United States Patent [19]

Van Cauter et al.

[11] Patent Number: 4,655,810
[45] Date of Patent: Apr. 7, 1987

[54] COATING HOT GLASS WITH METALS OR METAL COMPOUNDS, ESPECIALLY OXIDES

[75] Inventors: Albert Van Cauter, Charleroi; Robert Terneu, Thiméon; Robert Van Laethem, Loverval, all of Belgium

[73] Assignee: Glaverbel, Brussels, Belgium

[21] Appl. No.: 834,119

[22] Filed: Feb. 25, 1986

Related U.S. Application Data

[63] Continuation-in-part of Ser. No. 620,265, Jun. 13, 1984, abandoned.

[30] Foreign Application Priority Data

Jun. 17, 1983 [GB] United Kingdom ................ 8316532

[51] Int. Cl.⁴ .................... C03C 17/00; C03C 17/10
[52] U.S. Cl. ................................ 65/60.4; 65/60.1; 65/60.5
[58] Field of Search ............... 65/60.1, 60.3, 60.4, 65/60.5, 60.51, 60.52, 90, 99.1, 99.2; 427/168, 424; 118/326; 239/290, 296

[56] References Cited

U.S. PATENT DOCUMENTS

| | | | |
|---|---|---|---|
| 4,125,391 | 11/1978 | Van Laethem | 427/424 |
| 4,330,318 | 5/1982 | Van Cauter et al. | 65/60.1 |
| 4,349,369 | 9/1982 | Van Laethem et al. | 65/60.4 |
| 4,349,371 | 9/1982 | Van Laethem et al. | 65/60.4 |
| 4,349,372 | 9/1982 | Van Laethem et al. | 65/60.51 X |
| 4,414,015 | 11/1983 | Van Laethem et al. | 65/60.3 |

Primary Examiner—Kenneth M. Schor
Attorney, Agent, or Firm—Spencer & Frank

[57] ABSTRACT

A metal or metal compound coating is formed on a face of a hot ribbon 3 of freshly formed glass as it travels forwardly 4 through a coating station 19 where coating precursor material is sprayed onto the surface of the glass. The coating precursor material is sprayed in one or more streams 1 of droplets which is or are directed downwardly and forwardly towards the ribbon 4 and is repeatedly displaced to and fro across the ribbon path so that the ribbon 3 is scanned by the droplet stream(s) 1. Especially in order to form a thick coating of tin oxide on a rapidly moving ribbon, the velocities of the droplets in the stream(s) 1 are such that substantial splashing occurs at the ribbon face. Gas is continuously discharged along axes 6,7,8 behind the droplet stream 1 so as to maintain a forwardly directed flow of gas which envelops the rear half 15 of the or each stream 1 at least at the bottom portion of the stream trajectory and sweeps past the sides of such stream with sufficient velocity to entrain substantially all the splashes away from the stream. The entrained material is then removed from the environment of the ribbon through exhaust ducting 27.

28 Claims, 3 Drawing Figures

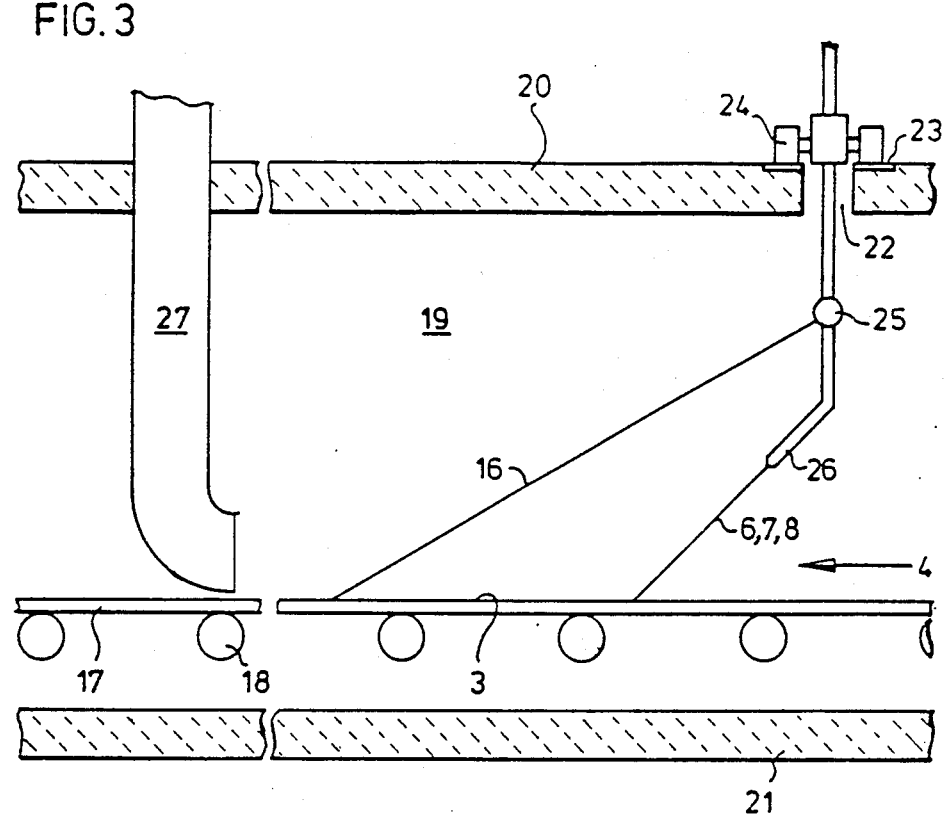

COATING HOT GLASS WITH METALS OR METAL COMPOUNDS, ESPECIALLY OXIDES

This application is a continuation of application Ser. No. 06/620,265, filed June 13th, 1984, now abandoned.

BACKGROUND OF THE INVENTION

This invention relates to a process for forming a metal or metal compound coating on a face of freshly formed ribbon of hot glass during its advance through a coating station, which method comprises spraying such substrate at that station with coating precursor material from which said coating metal or metal compound is formed on the said substrate face. The invention includes apparatus which may be used for carrying out such a process.

During the last ten years such research has been carried out with the object of devising processes whereby coatings of high optical quality can be formed under normal factory conditions and at commercially acceptable cost. It has for long been recognized that a major problem is how to control the conditions at the coating station so that the coating has predetermined optical properties over the entire coated area. The optical properties obviously depend, inter alia, on the thickness of the coating and on its composition and structure and therefore these factors must be kept as uniform as possible over the area of the coating.

It is evident from available literature that considerable attention has been given to the direction in which the coating precursor material is sprayed, as one factor which can influence the results of the process. In some previously proposed processes the coating precursor material is sprayed so as to form a droplet stream with its axis perpendicular to the path of the substrate. In other known processes the droplets are discharged towards the substrate as a stream whose axis is inclined downwardly towards the substrate, either in the direction of the substrate advance or in the opposite direction. These various procedures are referred to e.g. in U.S. Pat. No. 4,125,391.

In certain spraying procedures previously proposed the precursor material is sprayed in a plurality of droplet streams distributed over the width of the area to be coated. In others precursor material is sprayed in a stream (hereafter called "scanning stream") which is repeatedly displaced across the substrate.

In the interest of promoting constant and predictable coating conditions it is established practice to control the spraying of the precursor material so that the dynamic conditions at the zone of impingement of the precursor droplets on the substrate are equilibrated as much as possible. But it has for many years been recognized that objectionable coating defects are liable to occur even when the momenta of the droplets just prior to contact with the substrate are very low. This is because the coating quality achieved is susceptible to the influence of conditions in the gaseous environment above the substrate. Therefore various ways have been suggested of acting upon the environment in order to remove substances which might impair the coating.

One example of a process which includes an environmental control measure is described in the aforementioned U.S. Pat. No. 4,125,391. In that process suction forces are created in exhaust ducting located to cause gases to flow away from the droplet stream and its impingement zone. The specification explains that this measure avoids or reduces the tendency for decomposition products to precipitate onto the substrate or the already formed coating from within the gaseous environment and that the said control measure makes it easier to form coatings of homogeneous structure and affording uniform coverage of the substrate, provided that, as a condition of the process, the suction forces are controlled so that they are substantially without effect on the paths of the precursor droplets towards the substrate.

Other processes including environmental control measures are described in U.S. Pat. Nos. 4,349,369 and 4,330,318. The process described in U.S. Pat. No. 4,349,369 is performed by using a perpendicularly directed or inclined scanning spray and propelling gas across the scanning path of the spray, out of line with the droplet stream(s). The purpose of this gas propulsion is to clean the atmosphere in the scanning path of the droplet stream or streams by removing vapour phase reaction products which might otherwise be entrained towards the substrate by the droplet stream(s). The specification indicates that the scavenging gas current can be discharged continuously provided its source is displaced in tandem with the source of the droplet stream(s). If on the other hand the scavenging gas is discharged from a stationary source then the gas is discharged intermittently, out of phase with the movement of the spray, so that the scavenging gas current does not encounter the droplets.

In the processes described in U.S. Pat. No. 4,330,318 the precursor droplets are sprayed in a direction inclined downwardly and forwardly or downwardly and rearwardly to the substrate ("forwardly" meaning in the direction of the substrate movement), and a jet of gas is discharged against the rear of the or each downwardly inclined droplet stream. This jetting of gas has the effect of reducing the incidence of coating defects giving rise to light diffusion in particular at the coating surface or at the interfacial zone between the coating and the substrate. The assumed reason for this effect is that the gas intercepts substances which would otherwise be entrained towards the substrate from the environment immediately to the rear of the droplet stream(s). The specification explains that the precursor droplets can be discharged in a plurality of streams from stationary sources distributed across the path of the substrate, in which case the gas can be jetted from one or more stationary orifices extending or distributed across the substrate path. Alternatively use can be made of one or more scanning droplet streams and the gas can be discharged from an orifice or orifices which is or are displaced transversely across the path of the substrate together with the droplet stream(s). The specification indicates that the strength of the gas jet(s) should not be such as to make the droplet stream(s) unsteady.

By taking one or more of the environmental control measures above referred to it is possible to form coatings of very good optical quanity under mass production conditions. The known processes are however of restricted scope in respect of the coating formation rates (expressed in terms of coating volume per unit time) which can be achieved. This is because the known processes are governed by the principle of keeping the dynamic conditions at the spraying zone as steady as possible. To meet this condition, the spraying is controlled to effect a quite gentle deposition of the droplets on the substrate and the environmental conditions are controlled so as to disturb the droplet trajectories as little as possible. The maximum permissible coating formation rate which can be achieved depends on various factors and can differ from one process to another but it is in all cases too low for achieving the coating formation rates which are sometime desirable. Obviously the coating formation rate determines the thickness of coating which can be formed on a glass ribbon travelling at a given speed through the coating station.

SUMMARY OF THE INVENTION

The aim of the present invention is to provide a process which is suitable for achieving higher coating formation rates and can therefore be used for forming thicker coatings and/or for coating glass ribbons moving at higher speeds.

According to the present invention there is provided a process of forming a metal or metal compound coating on a face of a freshly formed ribbon of hot glass as it advances in a given direction (hereafter referred to as "forwardly") through a coating station, which method comprises spraying said face at that station with a coating precursor material from which said coating metal or metal compound is formed on the said face, characterised in that the coating precursor material is sprayed in the form of at least one stream of droplets which is directed downwardly and forwardly towards the glass ribbon and is repeatedly displaced transversely of the path of movement of the ribbon so that said ribbon face is scanned by the droplet stream(s); the velocities of the droplets in said stream(s) are such that substantial splashing of material from the said ribbon face occurs; gas is continuously discharged into the atmosphere behind the droplet stream(s) so as to maintain a forwardly directed flow of gas which envelops the rear half of the or each droplet stream, at least at the bottom portion of the stream trajectory, and sweeps past the sides of such stream with sufficient velocity to entrain substantially all the splashes away from the said stream; and such entrained material is then removed from the environment of the ribbon.

The invention involves a marked departure from established practice in that instead of controlling the spray to achieve a quite gentle impact of the droplets on the impingement zone, the droplets are given sufficient momentum to cause substantial splashing of material from the ribbon face being coated. In combination with such a relatively high energy spray use is made of a scavenging gas stream or streams of sufficient strength to entrain the splashes away from the vicinity of the spray and towards a region from which they are removed from the environment of the ribbon. The efficacy of these combined measures is dependent on the selection of a particular orientation of the sprayed droplet stream(s) and of a particular direction of the scavenging gas stream(s) in relation to the direction of movement of the ribbon. The droplet stream(s) must be inclined downwardly and forwardly towards the ribbon, (the forward direction being the direction of movement of the substrate), and the scavenging gas stream(s) must likewise travel in the forward direction.

The invention enables good quality optical coatings to be formed at appreciably higher rates than those attainable by the previous processes hereinbefore referred to. The combination of process features characterising the invention makes the higher coating rates compatible with the formation of coatings without or with only a very low population of internal or surface defects giving rise to light diffusion.

It is well known that coatings of high optical quality must not only be relatively free from such defects but must also be of substantially uniform thickness, and that the standard of thickness uniformity is influenced by temperature conditions affecting the coating formation. In carrying out the present invention known temperature control measures can be taken for promoting the formation of a coating whose thickness uniformity is of a high standard.

A particular recommended temperature control measure is that disclosed in U.S. Pat. No. 4,414,015 according to which a freshly formed ribbon of glass, preparatory to being coated, is thermally conditioned to eliminate or reduce temperature gradients across the ribbon width to be coated. The thermal conditioning step may for example involve the heating of margins of the glass ribbon to compensate for the faster cooling of such margins which normally occurs as the ribbon travels from the flat glass forming installation.

In certain very important embodiments of the invention, the spray droplets are composed of precursor material in aqueous solution. As compared with processes using a volatile organic solvent, which can largely evaporate from the droplets during their travel towards the substrate, in processes using an aqueous solution of the precursor material a larger proportion of the sprayed solvent reaches the ribbon and in the previously known coating processes the maximum attainable coating formation rates have proved to be particularly limited in such circumstances. Those coating rates can be greatly surpassed by employing the present invention.

The invention is of particular value for forming coatings from precursor material giving a low yield of coating material, i.e. a precursor material with a low conversion factor. A low conversion factor tends to restrict the coating formation speed. In making it possible considerably to increase the rate at which coatings can be formed from those precursor materials the invention makes a very important contribution to the art. In the most important application of the present invention it is employed for forming a coating from precursor material which at least as present in the sprayed droplets is inorganic. Such materials have low conversion factors as compared with organic materials. It is advantageous for example to use as the sprayed material an aqueous solution of a tin compound, such as hydrated stannous chloride ($SnCl_2.H_2O$), for forming a tin oxide coating on the glass. In practice only a small part of the tin compound used as the precursor reacts to form the coating. An aqueous solution of a tin compound is used as the sprayed material in certain embodiments of the present invention.

The potential benefits of the process are of course best realized at high volume rates of discharge of the precursor material. In practice this in turn implies that the material forming the or each droplet stream is sprayed under a relatively high pressure. Preferably the precursor material is sprayed under a gauge pressure of at least 10 bars.

The velocities of the spray droplets will in any given process depend not only on the pressure under which the droplets are sprayed, but also on other factors, including the form of the spray gun or other spraying head and the sizes of the spraying orifices. However in all preferred processes according to the invention the droplets have a mean velocity which is at least sonic velocity.

The gas which is discharged from behind the or each droplet stream must have a sufficient flow energy for carrying the splashes of material forwardly away from the vicinity of the droplet stream(s). The requisite minimum volume flow rate of this gas into the atmosphere behind the droplet stream(s) depends inter alia on the size or aggregate size of the gas discharge orifice(s).

Preferably however the total volume flow rate of the gas is at least 130 $Nm^3$/hour.

Advantageously, the total (NTP) volume of gas discharged from behind the or each droplet stream is at least equal to 40% of the total (NTP) volume of carrier gas discharged with said droplets.

In preferred embodiments of the invention, the coating is formed on the substrate at a volume rate of at least 6 $cm^3$/minute. By appropriate choice of the volume flow rate of the coating precursor material, such high rates of coating material formation on the glass ribbon can easily be achieved while at the same time attaining very good optical qualities.

The invention is primarily intended for forming coatings of at least 700 nm in thickness, and the amount of precursor material sprayed per unit time is preferably controlled accordingly. In preferred embodiments of the invention it is used for forming a coating of at least 700 nm in thickness and of at least 2 meters in widthwise extent, on a freshly formed ribbon of hot glass travelling at a speed of at least 4.5 meters per minute through the coating station. These are quite stringent conditions and generally speaking the prior art processes are not suitable for fulfilling them except when spraying very reactive precursor material. The process according to the invention is capable of fulfilling the said conditions for forming good quality coatings even from relatively low reactive precursor materials such as aqueous solutions of inorganic substances.

The coating formation rate achieved in a given process is influenced by the temperature conditions affecting the coating forming reaction. Within limits, the coating formation rate, and in some cases the coating quality, can be increased by increasing the temperature which the glass has at the coating station. In certain processes according to the present invention, the temperature of the glass is increased preparatory to coating by heating the glass at a thermal conditioning station between the coating station and the installation in which the glass ribbon is formed. At said thermal conditioning station the glass ribbon can be heated over its entire width, although differentially so as to reduce or eliminate temperature gradients across the ribbon as disclosed in the aforesaid U.S. Pat. No. 4,414,015.

There are certain advantages in heating a surface layer of the glass ribbon, at its side to be coated, either exclusively or to a greater extent that the remainder of the glass thickness, at a thermal conditioning station preceding the coating station along the ribbon path. Heating of a said surface layer is sufficient for influencing the thickness or the thickness and the quality of the coating. Preferably therefore, in carrying out a process according to the present invention a said surface layer is heated to a higher temperature than the remainder of the glass thickness preparatory to entering the coating station. For the purpose of heating a said surface layer of the glass, that side of the glass ribbon is exposed to one or more radiant heaters having a black body temperature below 1100° C. The radiant heat emitted by a radiator having a black body temperature below 1100° C. is strongly absorbed by the glass and in consequence substantially all of the incident radiant energy becomes absorbed by a thin surface layer.

The process can include successive thermal conditioning treatments preparatory to the coating operation. In accordance with the invention disclosed in a co-pending U.S. patent application filed by Robert Van Laethem et al. on May 9th 1984 entitled "Process for producing coated flat glass" and claiming the priority of the United Kingdom Patent Application No. 8,313,283 dated May 13th 1983, there may be a thermal conditioning zone in which temperature gradients across the ribbon are reduced and possibly eliminated, and a following thermal conditioning zone in which heat is supplied entirely or substantially entirely to a surface layer of the glass at the side to be coated by exposing that side to one or more radiant heaters as above specified. By following this procedure the temperature profile through the thickness of glass, after the coating step, can be close to what it would be in the absence of the surface heating and coating steps. This is an advantage because if it is desired to modify the composition or thickness of the coating, or even to terminate coating of the glass ribbon, this can be done by terminating the supply of the coating material and switching off the surface heater(s) and in those circumstances a following annealing installation will need no or only minor adjustment. It will be appreciated that the spraying of the coating precursor material has a cooling effect on the coated side of the ribbon which, in the absence of the surface heating step would produce through the thickness of the glass a temperature gradient whose steepness would tend to increase with the volume flow rate of the sprayed material and carrier gas. The use of the surface heating step is therefore of particular advantage when working with high coating formation rates.

The temperature conditions affecting the coating forming reaction also include the temperature of the sprayed droplets. The extent to which the precursor material is heated (if at all) preparatory to being sprayed can therefore be used as a control factor enabling the thickness and in some cases possibly also the quality of the formed coating to be varied within certain limits.

In certain processes according to the invention the gas which is discharged into the atmosphere behind the droplet stream(s) so as to maintain the forwardly directed flow of gas enveloping the rear half of the or each droplet stream is at a temperature such that the said gas flow influences the temperature of the droplets of said stream(s) on their way to the substrate. The performance of the invention in this way involves use of the invention disclosed in U.S. Pat. No. 4,349,371.

The said gas can be pre-heated to an extent such that the gas flow heats or reduces the cooling of the sprayed droplets with the result that the formed coating is thicker than it would otherwise be. Alternatively, the said gas can be discharged at a temperature such that the gas flow has a cooling effect of the droplets. Generally speaking such a cooling effect will not be required when carrying out this invention but circumstances may arise in which it can be used to advantage, e.g. for the purpose of a reducing adjustment of the coating thickness, if it proves initially to be greater than is required, or for switching from one coating specification to another.

In order to promote uniform coverage of the substrate, it is desirable for the impingement zone of the or each droplet stream on the substrate to have an appreciable length measured along the path of the glass ribbon. To this end it is preferred that the or each droplet stream should meet the ribbon at a rather shallow acute angle. For this reason, and taking into account practical features of construction of the apparatus, it is preferred that the axis of the or each droplet stream should make an angle of between 20° and 40° with the ribbon.

Preferably, at least some of the gas discharged from behind the or each droplet stream forms a jet which is directed towards the ribbon so that the axis of the jet makes with the ribbon an angle which is not less than a value equivalent to 10° less than the angle between the ribbon and the axis of such droplet stream. This condition has been found to be advantageous for obtaining good results with a very compact spatial arrangement of the gas discharge and spray nozzles. It is suitable for example for the axis of the said gas jet to be at the same angle to the ribbon as the axis of the droplet stream, or to be at a steeper angle (e.g. steeper by up to 20°) then said droplet stream axis.

Preferably, the gas discharged behind the or each droplet stream impinges on the ribbon at a zone or zones close to the rear of or overlapping with the zone of impingement of the droplet stream on the ribbon. There is then no unnecessary dissipation of the kinetic energy of the discharge gas before it performs its vital sweeping action around the droplet stream.

Gas can be discharged from one or more slot-like orifices to form a curtain extending across the full width of the ribbon path, or nearly so, but because of the gas velocity required this would entail discharging a very large quantity of gas. In order to reduce the amount of gas blown it is advantageous for the gas to be displaced from (a) nozzle(s) which is or are displaced so as repeatedly to traverse the ribbon path in synchronism with the droplet stream(s). For example said gas can be, and preferably is discharged substantially symmetrically beneath the or a said droplet stream.

In some embodiments of the invention gas discharged behind the or each droplet stream is discharged from a traversing single nozzle, for example a nozzle providing a slot-like discharge orifice, and preferably, a nozzle for delivering a fan-tail jet. However a more effective gas discharge pattern is provided if, as is preferred, the gas discharged behind the or each droplet stream is discharged from a plurality of traversing nozzles distributed substantially symmetrically with respect to a plane which contains the axis of such droplet stream. By discharging the gas from a plurality of nozzles it is easier to establish gas currents which are directed in a very effective manner in relation to the droplet stream. Consequently a given effect can be achieved using a smaller volume of gas than when a single large jet. Moreover the gas currents can be relatively adjusted. The most preferred procedure, being the one which has been found to give the best result, is to discharge the gas from a group of three nozzles, said group comprising a central nozzle with its axis in or close to said plane and a pair of outer nozzles located on either side of such central nozzle.

When using such a triple gas jet, the axis of the central gas jet, i.e. the jet issuing from the central nozzle, preferably makes with the ribbon an angle which is between 10° less than and 20° greater than the angle between the ribbon and the axis of the associated droplet stream. This range is selected from empirical data which shows this relationship between the angles of inclination of the central gas jet and the droplet stream to be helpful towards achieving the maximum benefit from the invention. This object can be further promoted by directing the outer jets so that their axes are at an inclination to the ribbon which is equal to or shallower than the inclination of the central jet. And this feature is adopted in some embodiments of the invention. In the more preferred arrangements the outer jets are inclined to the glass ribbon at a smaller angle than the central jet. The shallower angle gives the outer jets a greater forward momentum, which promotes their effectiveness.

Another factor which influences the action of the gas jets in a triple-jet situation is the spatial relationship between the zones at which the projected paths of the gas jets intersect the ribbon. It has been found that it is beneficial for the outer gas jets to impinge on the glass ribbon at zones which extend forwardly beyond the impingement zone of the gas jet issuing from the central nozzle.

In order to promote clearance of the atmosphere and substrate at both sides of the droplet stream, it is convenient for the gas jets issuing from the said outer nozzles to diverge forwardly by between 5° and 15° from a plane containing the axis of the associated droplet stream and the axis of the central gas jet. In some embodiments of this invention such a divergent direction of the outer gas jets is adopted. In preferred embodiments however, the outer gas jets converge forwardly towards such plane. Such a convergent arrangement requires a larger space envelope for accommodating the gas discharge nozzles but it is conducive to a more efficient action of the gas currents in entraining splashes of material.

When the gas discharging behind the or each droplet stream is discharged from a plurality of gas discharge nozzles as aforesaid, such nozzles may be disposed so that their axes are in common plane.

It is especially preferred that, where a plurality of gas jets is discharged behind the or each droplet stream, such jets should merge to form a continuous gas curtain prior to their impingement on the ribbon.

Preferably the gas jets discharged behind the or each droplet stream have mutually overlapping impact zones on the ribbon, behind or overlapping the impact zone of said stream.

The invention includes apparatus for forming a metal or metal compound coating on a face of a heated glass substrate.

According to the invention there is provided apparatus for forming a metal or metal compound coating on a face of a heated glass ribbon as it travels in a given direction (hereafter referred to as "forwardly") along a certain path, which apparatus comprises means for conveying a ribbon along said path, and at least one spray discharge nozzle located at a coating station on said path for spraying coating precursor material onto said ribbon, characterised in that there is a said spray discharge nozzle which is arranged for discharging a stream of droplets downwardly and forwardly towards the ribbon; there is gas discharge means including a plurality of gas discharge nozzles arranged in association with said spray discharge nozzle for discharging jets of gas into the atmosphere behind such droplet stream, said gas discharge nozzles being directed and relatively located so that the gas jets therefrom can together form a gas current which envelopes the rear half of the said droplet stream, at least at the bottom portion of the stream trajectory and sweeps forwardly past the sides of such stream; and there is a mechanism for displacing said spray discharge nozzle to cause said droplet stream repeatedly to traverse said ribbon path, and for displacing said gas discharge nozzles in synchronism with said spray discharge nozzle.

Apparatus according to the invention preferably incorporates one or more of the following optional features:

(i) the axis of the or each spray discharge nozzle makes an angle of between 20° and 40° with the ribbon path.

(ii) at least one of said gas discharge nozzles is arranged with its axis at an angle to the ribbon path which is equal to or greater than a value equivalent to 10° less than the angle between said path and the axis of said associated spray discharge nozzle;

(iii) said gas discharge nozzles are distributed substantially symmetrically with respect to a plane which contains the axis of said spray discharge nozzle;

(iv) there is a group of three said gas discharge nozzles, said group comprising a central nozzle with its axis in or close to a plane containing the axis of said spray discharge nozzle and a pair of outer nozzles located on either side of such central nozzle;

(v) there is a group of gas discharge nozzles as specified in (iv) above; the axis of the central nozzle makes with the ribbon path an angle which is between 10° less than and 20° greater than the angle between the ribbon path and the axis of the spray discharge nozzle; and preferably the axes of the outer gas discharge nozzles make with the ribbon path an angle which is equal to or less than the angle between said ribbon path and the axis of said central nozzle.

(vi) there is a group of gas discharge nozzles as specified in (iv) or (v) above and the axes of the outer nozzles diverge forwardly by between 5° and 15° from said plane containing the axis of the spray discharge nozzle.

(vii) there is a group of gas discharge nozzles as specified in (iv) or (v) above and the axes of the outer nozzles converge towards said plane containing the axis of the spray discharge nozzle.

(viii) the gas discharge nozzles are disposed so that their axes are substantially in a common plane.

(ix) means is provided for heating gas prior to its discharge through said gas discharge nozzles.

BRIEF DESCRIPTION OF THE DRAWINGS

FIG. 3 is an elevation view of an embodiment of coating apparatus according to the invention.

Figure 1:
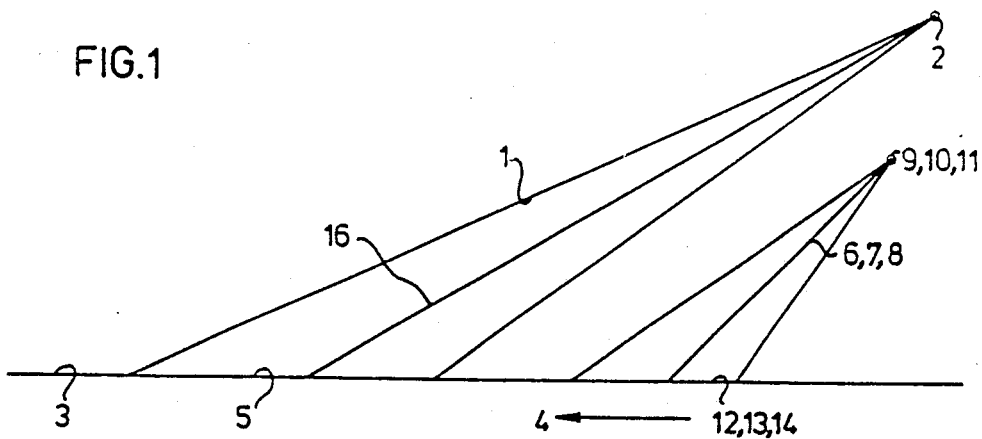
FIGS. 1 and 2 are respectively schematic representations of the discharge of coating precursor material and gas.
Figure 2:
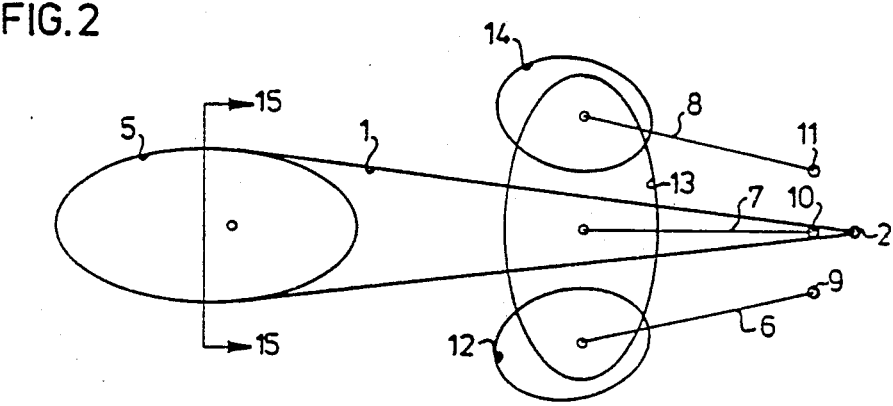

DESCRIPTION OF THE PREFERRED EMBODIMENTS

In FIGS. 1 and 2, a stream 1 of droplets of coating precursor material is sprayed from a nozzle having an orifice 2 towards the path 3 of a ribbon of hot glass. The glass advances along the path 3 in the forward direction indicated by the arrow 4 in FIG. 1. The droplet stream 1 meets the path 3 of the ribbon over an elliptical impingement zone 5 which repeatedly traverses across the width of the ribbon path. The droplet stream 1 is sprayed with sufficient velocity to cause splashing. In order to entrain the splash droplets in the forward direction 4, gas is discharged from behind the droplets stream. As shown in FIG. 2, three gas streams whose axes are shown at 6, 7, 8 are discharged respectively from gas discharge nozzle orifices 9,10,11 to form a forward current of gas which impinges on the ribbon path 3 at impingement zones 12,13,14 at least part of which are directly behind the droplet stream impingement zone 5 so that the rear half 15 of that zone is enveloped at least at a bottom portion of its trajectory, by gas deflected by the glass ribbon.

In accordance with a specific practical embodiment, the spray nozzle orifice 2 is located 60 cm above the ribbon path with its axis 16 aligned in the forward direction 4 at an angle of 30° to the path 3. The gas discharge nozzle orifices 9,10,11 are located 7 cm in front of and 23.5 cm below the spray nozzle orifice 2. The axes 6,7,8 of the gas nozzle orifices are coplanar in a plane at 45° to the horizontal. The central gas nozzle orifice 10 has its axis 7 aligned in the forward direction 7 and is arranged to deliver a flat fan jet with a 53° spread in the plane of the gas nozzle axes. The horizontal distance between each of the side nozzle orifices 9 and 11 and a vertical plane containing the axis 7 of the central gas discharge orifice 10 is 9 cm and each of the side nozzle axes 6,8 diverges by 9° from the axis 7 of the central orifice in the plane of those axes. Each of the two side nozzles is arranged to deliver a 20° round jet of gas. Thus the total zone of gas impingement 12,13,14 on the ribbon path is at least twice as wide as the zone impingement 5 of the droplet stream 1.

In FIG. 3, a continuous ribbon of flat glass 17 is conveyed along a path 3 in a forward direction 4 by conveyor rolls 18 through a coating station 19 in a tunnel having a roof 20 and a sole wall 21. The tunnel roof 20 has a transverse slot 22 on each side of which runs a track 23 supporting a carriage 24 which mounts a spray head 25 for spraying droplets of coating precursor material and gas discharge means 26 for discharging gas as described with reference to FIGS. 1 and 2. Waste gases are aspirated through a chimney 27.

EXAMPLE 1

It was desired to provide a freshly formed ribbon of float glass with a doped tin oxide coating in order to provide sheets cut from the ribbon with infra-red screening properties.

To this end, a coating station as represented in FIG. 3 was located between the exit from the float tank and the entrance to an annealing lehr so that the ribbon could be coated by pyrolysis while still hot. The spraying means and the gas discharging means in this coating station are arranged to produce a droplet stream and triple gas jets are represented in FIG. 2, the relative positions and angles of the spray and gas discharge nozzles, and the forms and relationships of the gas jet impingement zones being in accordance with the practical embodiment hereinbefore described with reference to FIG. 2.

The ribbon was 2.5 m wide, 6 mm in thickness and travelled through the coating station at a speed of about 8.5 m/min. where its mean temperature was about 600° C.

A solution of coating precursor material was made up of $SnCl_2.2H_2O$, $NH_4HF_2$ and water.

In order to form a coating 750 nm thick, this coating precursor solution was sprayed at a rate of 165 L/hour through an atomizing nozzle using air as carrier gas delivered at 250 $Nm^3$/hour under a gauge pressure of 14 bars while the nozzle are caused to traverse to and fro across the ribbon path at a frequency of 25 cycles per minute. This spray rate was sufficient to cause rebound splashing when the droplet stream impinged on the glass ribbon.

In order to entrain these droplets in the downstream direction towards the aspirating chimney, so that a portion of the surface of the ribbon is not contacted by them at least before it is first swept by the droplet stream as such, air was discharged from the central nozzle 10 at a volume rate of 90 Nm³/hour and from each of the outer nozzles 9,11 at a volume rate of 45 Nm³/hour, making a total volume flow rate of 180 Nm³/hour. The air was discharged under a gauge pressure of 4.4 bars. This discharge of gas from the three nozzles substantially prevented stray droplets, resulting from splashing, from contacting the ribbon. The formed coating eas examined and was found to be of good optical quality. In this example the air was delivered to the gas discharge nozzles at a temperature of 20°–25° C. But the air could be preheated.

EXAMPLE 2

A freshly formed hot ribbon of glass 2.5 meters wide and travelling at 7 meters per minute was coated at a coating station equipped with spraying and gas discharge means as used in Example 1. In this second example as in the first, the spray nozzle orifice was located 60 cm above the ribbon path, with its axis at 30° to the ribbon path and the gas discharge nozzle orifices 9,10,11 were located 7 cm in front of and 23.5 cm below the spray nozzle orifice 2. However the axis 7 of the central gas jet was at the same inclination (30°) to the glass ribbon as the axis 16 of the droplet stream, the horizontal distance between each of the outer gas discharge orifices 9 and 11 and a vertical plane containing the axis of the central gas discharge orifice 10 was 44 cm, and each of the outer gas discharge nozzles was directed so that its axis was inclined at 10° to the glass ribbon and conveyed forwardly towards the vertical plane containing the axis of the central nozzle, making with that plane an included angle of 15°.

A solution of coating precursor material as used in Example 1 was sprayed at a rate of 165 L/hour using air as carrier gas delivered at 270 Nm³/hr under a gauge pressure of 14.5 bars, while the nozzle was displaced to and fro across the ribbon path at a frequency of 25 cycles per minute. In consequence, substantial splashing of sprayed material from the ribbon face occurred.

Air was discharged under a gauge pressure of 3 bars from the central nozzle 10 at a volume rate of 61 Nm³/hr and from each of the outer nozzles 9 and 11 at a volume rate of 45 m³/hr.

The formed coating was examined and was found to be of good optical quality.

EXAMPLE 3

Example 2 was repeated, with however the following modifications. The outer gas discharge nozzles were moved to a horizontal spacing of 63 cm from the vertical plane containing the central gas discharge nozzle and were inclined so that the axis of each of those outer nozzles converged towards that central vertical plane at an included angle of 20° and was at an inclination of 20° to the glass ribbon; and air was discharged from each of those outer nozzles at a volume rate of 35 Nm³/hr under a gauge pressure of 2 bars, for which purpose the outer nozzles were supplied with air independently of the central gas discharge nozzle. As in Example 2 air was discharged from that central nozzle at 61 Nm³/hr under a gauge pressure of 3 bars. A coating of good optical quality was formed.

What we claim is:

1. A process of forming a metal or metal compound coating on a face of a freshly formed ribbon of hot glass as it advances in a forward direction along a path through a coating station, comprising the steps of: (a) spraying said face with a material from which said coating is formed on said face by directing at least one stream of droplets of said material downwardly and in the direction of the advance of said glass ribbon towards the glass ribbon and repeatedly displacing said at least one stream transversely of said path so that said ribbon face is scanned by said at least one stream, said at least one stream of droplets having a rear half and having a stream trajectory with a top portion and a bottom portion, said at least one stream of droplets additionally having a central axis which makes an angle of between 20° and 40° with the glass ribbon, said droplets being sprayed by imparting to them a mean velocity which is at least sonic velocity; (b) continuously discharging gas into the atmosphere behind said at least one stream of droplets so as to maintain a forwardly directed flow of gas which envelops the rear half of said at least one stream of droplets, at least at the bottom portion of the stream trajectory, and which sweeps past the sides of such at least one stream; and (c) then removing the flow of gas which envelopes the rear half of said at least on stream of droplets away from adjacent the ribbon, with the flow of gas entraining material which has rebounded from said glass ribbon face when said droplet stream impinges on said glass ribbon face.

2. A process according to claim 1, wherein step (a) is conducted using material in aqueous solution.

3. A process according to claim 1, wherein step (a) is conducted using inorganic material.

4. A process according to claim 3, wherein step (a) is conducted using material comprising an aqueous solution of an inorganic tin compound.

5. A process according to claim 1, wherein step (a) is conducted by spraying said material under a gauge pressure of at least 10 bars.

6. A process according to claim 1, wherein step (b) is conducted by discharging said gas into the atmosphere behind said at least one stream of droplets at a temperature such that the forwardly flowing gas influences the temperature of the droplets of said at least one stream on their way to the glass.

7. A process according to claim 1, wherein step (b) is conducted using a total volume flow rate of said gas into the atmosphere behind said at least one stream of at least 130 Nm³/hr.

8. A process according to claim 1, wherein step (b) is conducted using a total (NTP) volume of gas discharged from behind said at least one stream that is at least equal to 40% of the total (NTP) volume of carrier gas discharged with said droplets.

9. A process according to claim 1, wherein steps (a) and (b) are conducted at a rate that forms the coating on the ribbon at a volume rate of at least 6 cm³/minute.

10. A process according to claim 9, wherein step (a) is conducted using an amount of material sprayed per unit time such that the formed coating has a thickness of at least 700 nm.

11. A process according to claim 10, wherein the speed of the glass ribbon through the coating station is at least 4.5 meters per minute and wherein step (a) is conducted by spraying said face in a pattern having a widthwise extent across the ribbon of at least 2 meters.

12. A process according to claim 1, further comprising the step of increasing the temperature of the glass preparatory to coating by heating the glass at a thermal conditioning station between the coating station and the installation in which the glass ribbon is formed.

13. A process according to claim 1, further comprising the step of heating a surface layer of the glass ribbon, at its side to be coated, to a higher temperature than the remainder of the glass thickness preparatory to entering the coating station.

14. A process according to claim 13, wherein said step of heating is conducted by exposing that side of the glass ribbon to at least one radiant heater having a black body temperature below 1100° C.

15. A process according to claim 1, wherein step (b) is conducted by forming a jet with at least some of the gas discharged behind said at least one stream of droplets, said jet having an axis and being directed towards the ribbon so that the axis of the jet makes with the ribbon an angle which is not less than a value equivalent to 10° less than the angle between the ribbon and the axis of said at least one stream of droplets.

16. A process according to claim 15, wherein the gas discharged behind said at least one stream of droplets impinges on the ribbon at at least one gas impingement zone, wherein said at least one stream of droplets impinges on the ribbon at at least one droplet impingement zone having a rear portion, and wherein step (b) is conducted by directing the discharged gas so that said at least one gas impingement zone lies adjacent the rear portion of said at least one droplet impingement zone.

17. A process according to claim 15, wherein the gas discharged behind said at least one stream of droplets impinges on the ribbon at at least one gas impingement zone, wherein said at least one stream of droplets impinges on the ribbon at at least one droplet impingement zone, and wherein step (b) is conducted by directing the discharged gas so that said at least one gas impingement zone overlaps said at least one droplet impingement zone.

18. A process according to claim 1, wherein step (b) is conducted by discharging said gas from at least one gas discharge nozzle and displacing said at least one gas discharge nozzle so as to traverse the ribbon path in synchronism with said at least one stream of droplets.

19. A process according to claim 1, wherein step (b) is conducted by discharging said gas from a plurality of gas discharge nozzles distributed substantially symmetrically with respect to a plane which contains the axis of such droplet stream, and by displacing said gas nozzles so as to traverse the ribbon path in synchronism with said at least one stream of droplets.

20. A process according to claim 19, wherein said at least one stream of droplets provides a droplet impact zone on said ribbon, wherein gas issues from said plurality of gas discharge nozzles in jets having mutually overlapping gas impact zones on the ribbon, and further comprising locating said plurality of gas discharge nozzles so that said gas impact zones overlap said droplet impact zone.

21. A process according to claim 19, wherein there are a central gas discharge nozzle having an axis and a pair of outer gas discharge nozzles, and further comprising locating said central nozzle with its axis adjacent said plane and locating said outer nozzles on either side of said central nozzle.

22. A process according to claim 21 wherein gas issues from said central nozzle in a jet having an axis, and wherein the step of locating the central nozzle comprises directing the central nozzle so that the jet axis makes with the ribbon an angle which is between 10° less than and 20° greater than the angle between the ribbon and the axis of said at least one stream of droplets.

23. A process according to claim 22, wherein gas issues from from said outer nozzles in jets having axes, and wherein the step of locating said outer nozzles comprises directing the outer nozzles so that the axes of the jets from the outer nozzles make with the ribbon an angle which is not greater than the angle between said ribbon and the axis of the gas jet issuing from said central nozzle.

24. A process according to claim 21, wherein gas issues from the central and outer nozzles in jets and wherein the steps of locating the central and outer nozzles comprise directing the nozzles so that the gas jets issuing from the outer nozzles impinge on the ribbon at zones which extend forwardly beyond the impingement zone of the gas jet issuing from the central nozzle.

25. A process according to claim 21, wherein gas issues from the outer nozzles in jets having axes and wherein the step of locating the outer nozzles comprises directing the outer nozzles so that the axes of the gas jets issuing from said outer nozzles diverge forwardly by between 5° and 15° from said plane containing the axis of said at least one stream of droplets.

26. A process according to claim 21, wherein gas issues from the outer nozzles in jets having axes and wherein the step of locating the outer nozzles comprises directing the outer nozzles so that the axes of the gas jets issuing from the outer nozzles converge forwardly towards said plane containing the axis of said at least one stream of droplets.

27. A process according to claim 19 wherein the plurality of gas jets discharged behind said at least one stream of droplets merge to form a continuous gas curtain prior to their impingement on the ribbon.

28. A process according to claim 19, wherein said at least one stream of droplets provides a droplet impact zone on said ribbon, wherein gas issues from said plurality of gas discharge nozzles in jets having mutually overlapping gas impact zones on the ribbon, and further comprising locating said plurality of gas discharge nozzles so that said gas impact zones lie behind said droplet impact zone.

* * * * *